United States Patent [19]

Dabbaj

[11] Patent Number: 5,132,675
[45] Date of Patent: Jul. 21, 1992

[54] DISPLAY DEVICES AND DISPLAY ELEMENTS THEREOF

[76] Inventor: Rad H. Dabbaj, Flat 4, 3 Westbourne Crescent, London, United Kingdom, W2 3DB

[21] Appl. No.: 474,078

[22] PCT Filed: Nov. 11, 1988

[86] PCT No.: PCT/GB88/00998

§ 371 Date: May 29, 1990

§ 102(e) Date: May 29, 1990

[87] PCT Pub. No.: WO89/04530

PCT Pub. Date: May 18, 1989

[30] Foreign Application Priority Data

Nov. 13, 1987 [GB] United Kingdom ............... 8726697
Jan. 9, 1988 [GB] United Kingdom ............... 8800439
Jan. 11, 1988 [GB] United Kingdom ............... 8800440
Jan. 11, 1988 [GB] United Kingdom ............... 8800441

[51] Int. Cl.⁵ .............................................. G09G 3/16
[52] U.S. Cl. ................................ 340/764; 340/783; 340/815.1; 340/815.27; 40/476; 40/491
[58] Field of Search ............... 340/764, 783, 752, 763, 340/815.08, 815.09, 815.23, 815.24, 815.25, 815.27; 40/482, 486, 491, 598, 476, 488; 350/269

[56] References Cited

U.S. PATENT DOCUMENTS 3,161,726  12/1964  Todt .
4,949,488   8/1990  Holk ...................................... 40/476
4,958,150   9/1990  Dabbaj ............................... 340/764

FOREIGN PATENT DOCUMENTS 0048904   9/1938  France .
0350958   6/1931  United Kingdom .
2190528  11/1987  United Kingdom .
8000103   1/1980  World Int. Prop. O. .
8504506  10/1985  World Int. Prop. O. .

Primary Examiner—Alvin E. Oberley
Assistant Examiner—Chanh Nguyen
Attorney, Agent, or Firm—Flehr, Hohbach, Test, Albritton & Herbert

[57] ABSTRACT

A display device, e.g. for sports stadium or airport, consists of a large array of individual 'pixels' representing single dots of a large display. Each 'pixel' or display element consists of a number of sets of different colored vanes, some moveable to alter the colors or quality of the light reflected by the element. By using sets of two vanes, each with differently colored areas extending across the vanes transverse to the direction of movement, three distinct color mixes can be provided using two vanes per set, or six distinct mixes using three vanes per set.

18 Claims, 5 Drawing Sheets

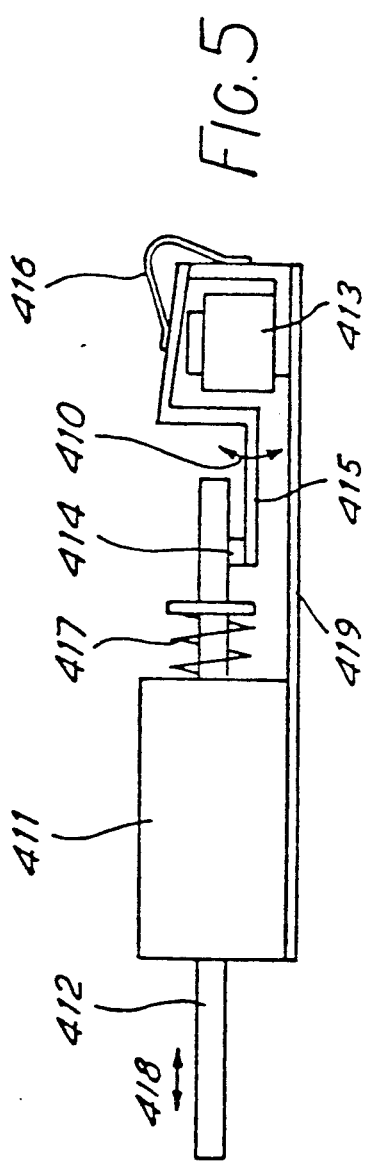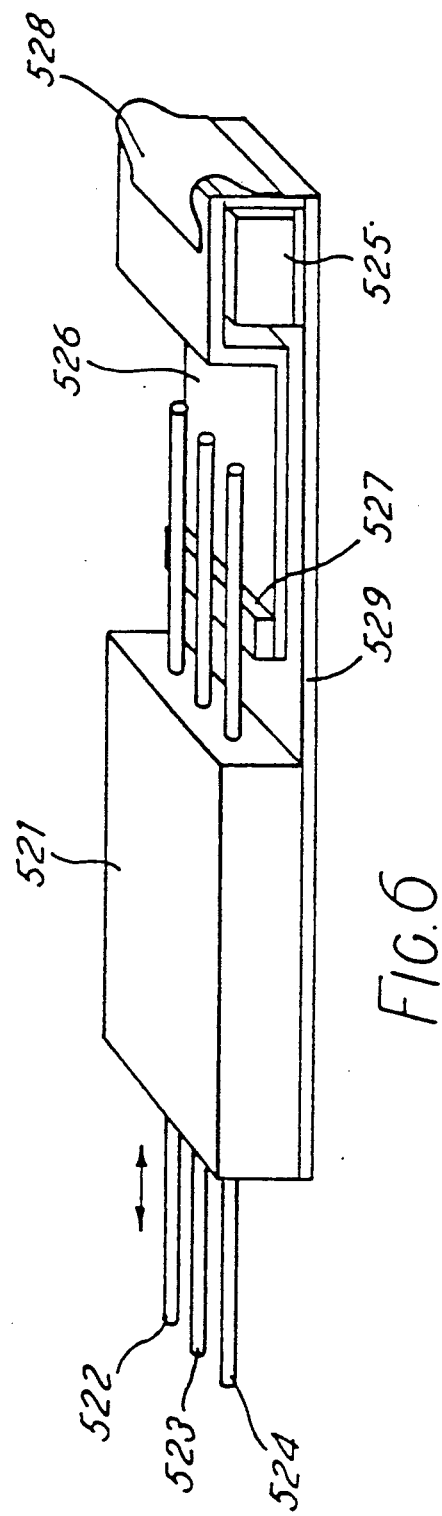

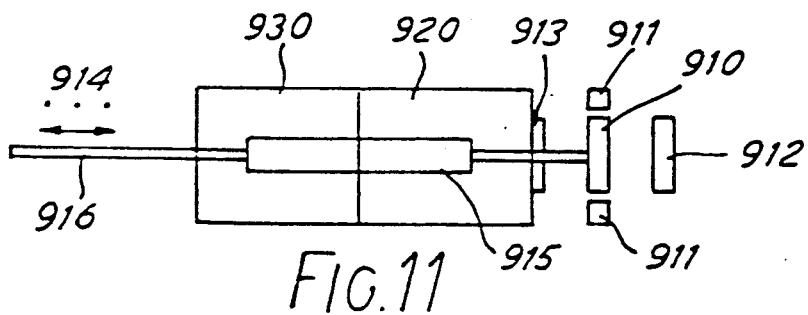
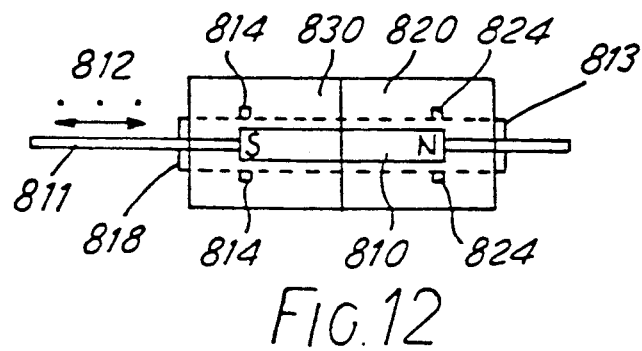
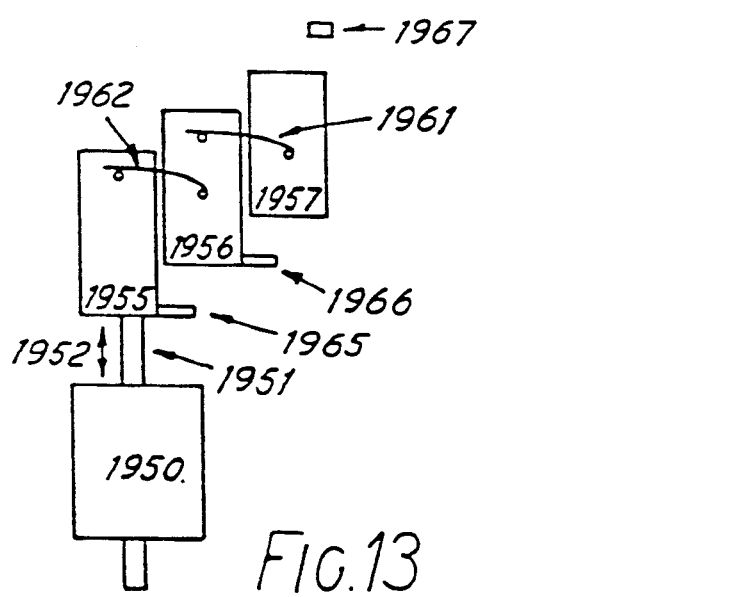

DISPLAY DEVICES AND DISPLAY ELEMENTS THEREOF

The present invention relates to a display element or a pixel and to a display device comprising a plurality of such elements or pixels, and in particular to a lightreflective display element or pixel with controllable light reflecting properties. In the context of the present specification and claims, the term 'pixel' means a dot or element within a display device which forms only a small proportion of the total image display area.

Display devices such as a large-scale picture devices in sports arenas and alpha-numeric display devices at airports and railway stations suffer from a number of disadvantages. For example with light-emitting colour displays such as tricolour displays only a fraction of the surface area is used to provide each colour. To indicate "blue" on a device employing the principle of colour television, less than a third of the available surface area may be used. With devices employing coloured bulbs, even a smaller fraction of the surface area may be used. The displays of mechanical lightreflective display devices employing shutters or flaps can be varied only relatively slowly; in addition the shutters are either visible, in which case they spoil the visual appearance of the display, or hidden behind fixed covers, which reduces the effective surface area of the display.

The present invention seeks to overcome or reduce one or more of the above disadvantages.

An earlier proposal in WO 87/07066 proposes a display device consisting of a plurality of pixels as hereinbefore defined arranged to form a matrix covering an area, and control means for individually setting the properties of each pixel whereby desired information can be displayed over said area, characterised by light reflective pixels which each comprise a plurality of sets of two or more vanes arranged one behind the other with a forward surface of each set visible from the front, the vanes within each set lying in closely adjacent parallel planes, the sets being also parallel but displaced one behind the other; driving means for individually driving each group formed by corresponding vanes in each set, except the foremost, so that the vane forward surfaces are selectively viewable from the front; each group of vanes being coloured with a respective plain colour different from that of the other group(s). Using pixels of the kind described allows a full spectrum of colour mixtures to be obtained by using one fixed and two movable groups of vanes, each group being coloured with one plain primary colour.

It has now been realised that a similar mechanism but employing only one fixed and one movable vane per set can be used to provide a wide spectrum of colour mixtures. According to the invention, there is provided a light reflective display element having a plurality of sets of two vanes arranged with a forward surface of each set visible from the front, the vanes within each set lying one behind the other in closely adjacent parallel planes, the sets being also parallel but displaced one behind the other; the rear group of vanes being drivable so that its forward surfaces are selectively viewable from the front; and driving means capable of positioning the movable vanes in two extreme positions and also in an intermediate position, whereby differently coloured areas on each vane are exposed or covered so as to provide at least three different colour mixes from the two vanes of each set. Such a display element allows the display of highly contrasted colours from fewer groups of vanes; thus it is cheaper to manufacture and simpler to control than the earlier proposal.

In a preferred form the vanes are divided into at least two areas extending across the vanes transversely to the direction of movement, which areas carry different plain colours.

Preferred embodiments of the present invention will now be described, by way of example only, with reference to the accompanying drawings, of which:

FIGS. 5 to 13 show schematic views of nine drive means for display elements according to the present invention.

Figure 1:
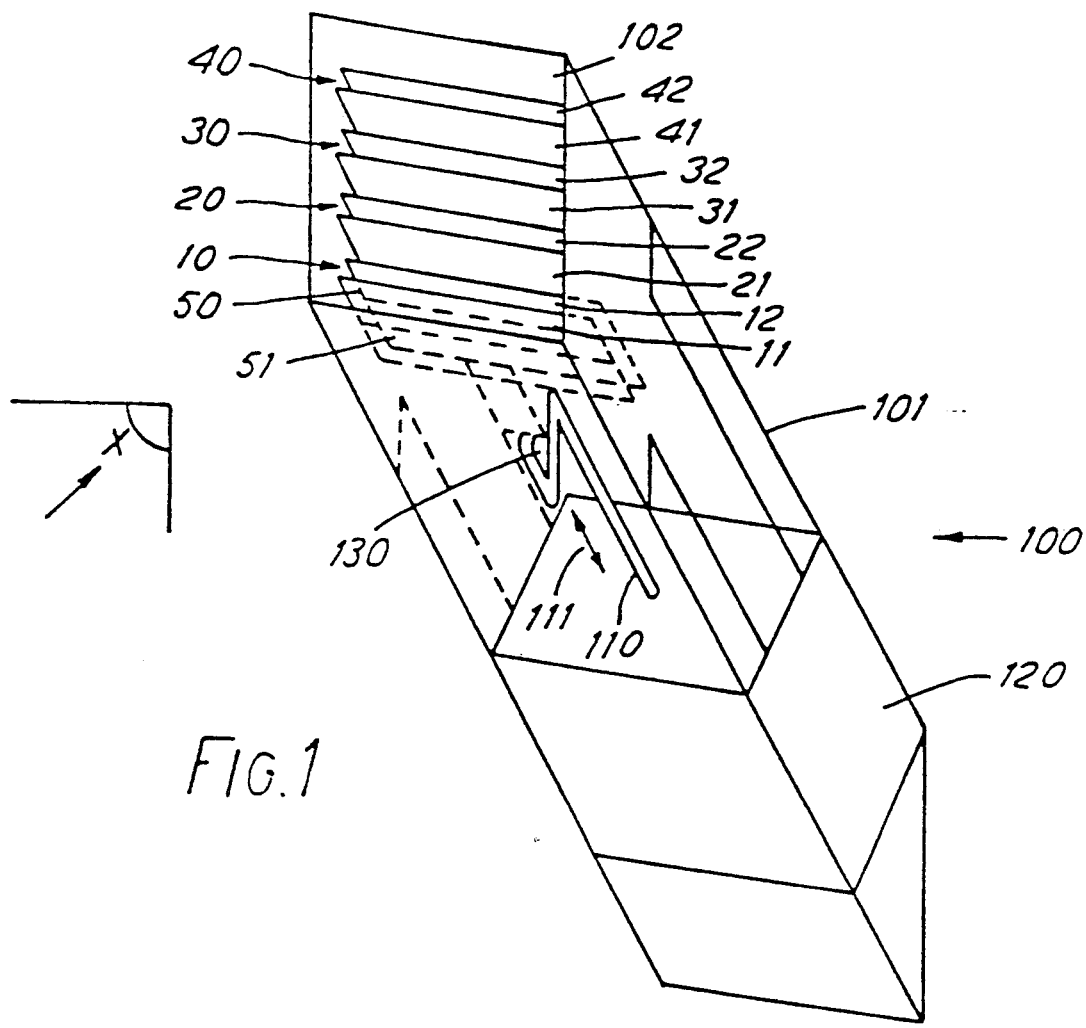
FIG. 1 shows a bottom perspective view of a display element in accordance with a first embodiment of the present invention.
Figure 2:
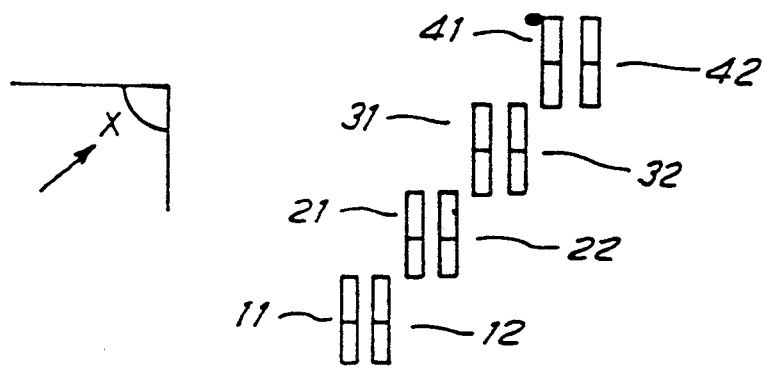
FIG. 2 shows a side view of the vanes that are part of the display element in accordance with the first embodiment of the present invention.

FIGS. 1 and 2 shows a display element 100 in accordance with a first embodiment of the invention. The element may be used alone, but usually an array of immediately adjacent elements 100, arranged in rows and columns, will be used to form a large display. The element 100 comprises a casing 101 with a transparent window 102 at the front. Within the casing adjacent to the window, are provided a plurality of rectangular plates or vanes arranged in four sets 10,20,30,40, each set containing two vanes. The front surfaces of corresponding vanes in each set are coloured with the same colours to form a group of vanes. Each vane in a group is coloured with two colours in the form of colour stripes. One at the upper visible part 50 of the vane and the other one at the lower visible part 51 of the vane. Thus, for example, the upper front visible parts of the group of vanes 11,21,31,41 may be coloured yellow, and the lower front visible parts may be coloured blue-cyan; this group will be called A1. The front surfaces of the group of vanes 12,22,32,42 will be coloured with, for example, magenta for the upper front parts of the vanes, and blue-cyan for the lower parts; this group will be called A2.

As shown the vanes of group A1 are fixed relative to the casing 101, and the vanes of group A2 are mounted on a plate 130 which in turn is mounted on an axially movable support rod 110. As indicated by the double-headed arrow 111, rod 110 is capable of being reciprocated by electromagnetic drive means 120. In FIG. 1, the group A2 is in the "down" position in which it is completely hidden so that the display colour appears as green (the mixture of yellow and blue-cyan) to an observer looking at the element within the angular range x. When rod 110 moves the group A2 to the "half-way up" position, the upper parts of the vanes in A2 are revealed and so the display appears red (the mixture of magenta and yellow). When A2 moves to the "completely up" position, both the upper and lower parts of the vanes in A2 are revealed and so the display appears blue (the mixture of magenta and blue-cyan). If a single element is used, front vane 11 or a part of casing 101 may still be visible. However, if a plurality of elements 100 are used to form a column of a display device, front vane 11 may be arranged to be concealed by the display element casing 101 or behind the back of the rear vane 42 of the next display element below.

Besides the three positions described above, rod 110 may be moved to any other intermediate position such that the element 100 may display further possible colour mixtures with different proportions of the yellow, blue-cyan and magenta, which, at normal viewing distances, will appear as other colours.

It is therefore desirable to use suitable primary colours from which as many secondary colours as possible may be obtained by controlling the displacement of the groups relative to each other. These primary colours may be red, green and blue.

There are a number of modifications that may be made to the embodiment described. The vanes in a group may have three or more colours, in which case a wider range of colour mixtures and/or a more flexible display may be obtained. At least one of the groups may be coloured with two or more colours, while the other(s) may be coloured with only one colour (on the upper and lower parts of vanes). The colours of a multi-colour vane may occupy equal or different amounts of its front visible area depending on the application of the element.

It may be preferable to place an additional colour stripe on the vanes between the existing colour stripes. These would be either black, of a neutral colour or of a colour that would blend in with the back-ground of the display device. This addition may be necessary to compensate for the larger tolerances.

Figure 3:
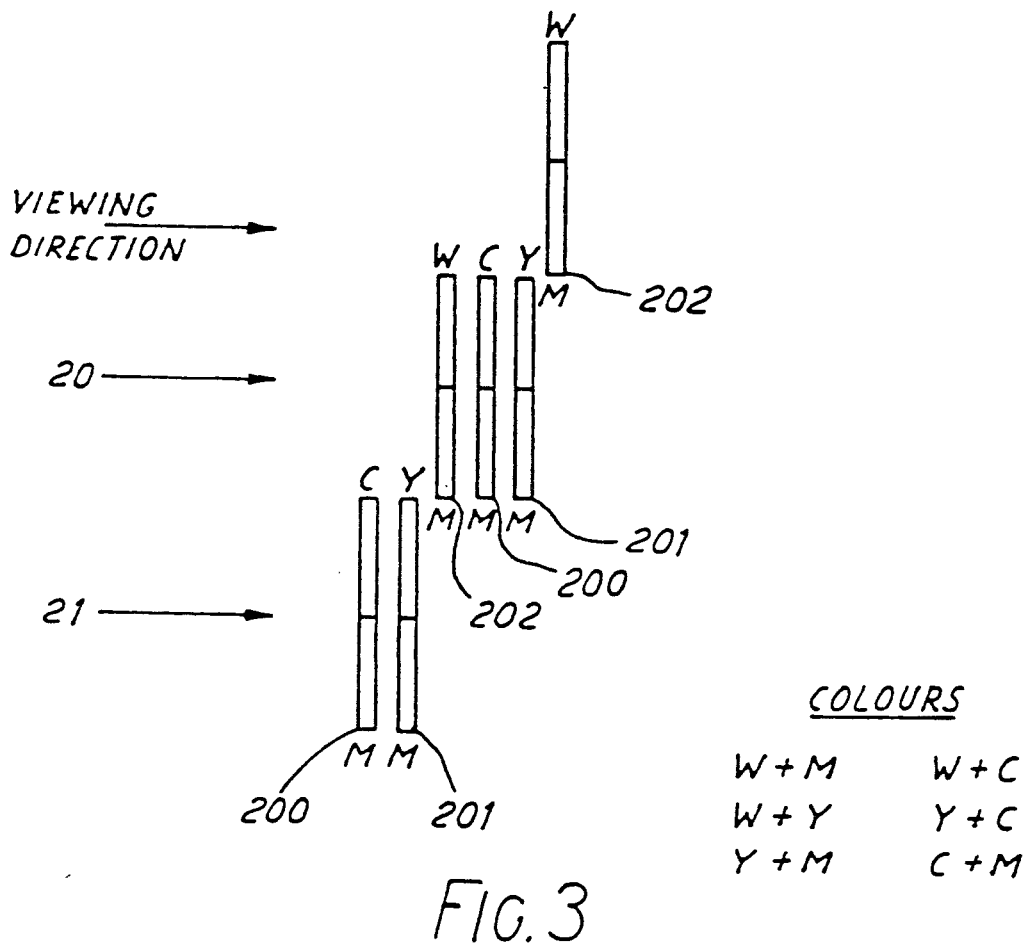
FIG. 3 shows a side view of the vanes that are part of the display element in accordance with a second embodiment of the present invention.

In a second embodiment an additional group of vanes having different colours to those in the other groups can be added to the groups described in the first embodiment. FIG. 3 shows a display element according to the second embodiment of the invention. There are three groups 200-202 of two vanes, in two sets 20,21 of three vanes. Each of the vanes in a group 200,201,202 is coloured with the same two colours. The vanes in the group 200 nearest to the viewing position are fixed and are coloured cyan and magenta. Behind these vanes are moving vanes 201 coloured yellow and magenta which comprise a first moving group 201 of vanes. Behind these vanes are vanes coloured white and magenta which comprise a second moving group 202 of vanes. The moving groups 201,202 of vanes are each driven by separate electromagnetic drive means which allow them to be placed in the "down", "half-way up" and "up" positions.

In FIG. 3 the vanes in the first moving group 201 are "down" and those in the second moving group 202 are "up". Thus, the viewer will see a mixture of white and magenta. As with the first embodiment the front vane is still visible although, in practice, it may be concealed by using a column of display elements as described for the first embodiment. If the vanes are in the position shown in FIG. 3 and then the vanes in the first moving group 201 are moved into the "half-way up" position a mixture of white and yellow will be seen. If the vanes of the first moving group 201 are then moved into the "up" position a mixture of yellow and magenta will be seen. Altogether a display element of this type can make six different colours as shown in FIG. 3. This embodiment increases the flexibility of the display as it allows more colours to be produced than may be produced by display elements according to the first embodiment of the invention.

Figure 4:
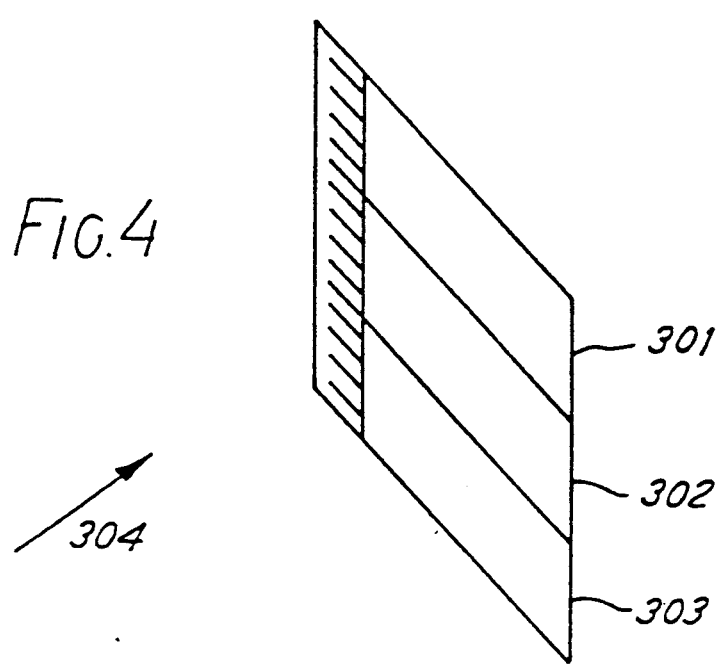
FIG. 4 shows a display device comprising three display elements according to the invention.

Both embodiments of the invention may be used in a display device containing, for example, three display elements 301,302,303 (FIG. 4). This type of display device has the advantage that all of the display area is used in the display process. In addition, the device may be inclined so that the vanes are at an angle to allow the device to be viewed at the optimum angle for clarity of image in and around the direction of arrow 304.

There are a number of modifications that may be made to either embodiment of the invention.

The number, size, height and thickness of the vanes may be chosen to suit different applications. The vanes are generally inclined in the upwards and forwards direction as shown in FIG. 1, as the display is normally viewed from bottom left. Other inclinations are also possible e.g. downwards and forwards.

The vanes may be operated dynamically whereby the vanes in one group, at any position, may be oscillated so as to continuously and alternately reveal or block all or part of the vanes of the group located immediately behind them. Provided this is done at proper speed, a mixture of the visible parts of the groups will be produced and the eye will perceive the overall colour mixture.

The vanes may be coloured with any suitable paint including fluorescent or phosphorescent paint.

Instead of mounting the electromagnetic drive means directly below the vanes the drive means may be placed behind the vanes, with the support rod at right angles to the vanes. This form of electromagnetic drive means is described in greater detail in Publication WO 86/07066.

Other suitable methods of manufacture and painting are also described in WO/07066.

Instead of a substantially continuous display, the display elements may be arranged to constitute the different segments of a seven segment character display unit. A dot matrix type of display unit may also be formed with the individual reflective areas of the vanes being of square, circular, rectangular or honeycomb shape.

In all embodiments of the present invention the vanes may be curved around a vertical axis to improve the horizontal viewing angle. Although one group of vanes is usually fixed, if desired, all groups may be movable. It is envisaged that a display element according to the invention may comprise only one set of vanes.

The display element may each incorporate a switch actuated by the displacement of the armature.

In another embodiment the vanes of all groups may be made in arc shapes where the surface of each single vane lies on the circumference of an imaginary circle, characterised in that the circles made up by the inner vanes have progressively smaller radii. All the circles are concentric and group displacements are circular, such that the vanes do not obstruct by one another.

It would be possible to manage with one set of vanes covering the whole size of an element rather than splitting it into a number of sets i.e. the element may contain one set only.

The electromagnetic drive means for the display elements described may be of various types. They may be monostable (e.g. having a spring-loaded armature with one stable state), polarised, or bistable (where the armature can be magnetically latched into either of two positions). Alternatively multi-stable states electromagnetic drive means may be employed, so that the vanes can occupy intermediate positions. Two electromagnetic drive means are described below by way of example. In both of the electromagnetic means, a non-magnetic pin connects the armature to the vanes.

A first actuator (FIG. 5) comprises a main electromagnet in the form of solenoid 411 for producing displacements 418 of a first armature 412 which is restrained by spring 417. A second electromagnet in the form of a relay 413 has a spring 416 restraining a second armature 415. The second armature 415 forms a latch which bears on the other end of the first armature 412 via a pressure pad 414 made of high friction material. The actuators are firmly connected to a chassis 419. The second armature 415 moves in direction 410.

When the power is turned off the first armature 412 is permanently held in place due to the action of spring 416 which holds pad 414 against it. To displace the first armature 412, the relay 413 is first energised to free the first armature 412 and then the solenoid 411 is energised to produce the desired displacement. Once the first armature 412 has settled, the relay 413 is then de-energised and the pressure pad 414 is again brought into contact with the first armature 412 to hold it in position. The solenoid 411 may then be deenergised. The device only consumes power when changing from one displacement level to another. The actuator may be utilised in a display element by connecting the vanes to the first armature 412.

A second actuator (FIG. 6) comprises a number of electromagnets sharing a common stop mechanism. In this arrangement all of the electromagnets may need to be energised/de-energised simultaneously in order to utilise the single stop 527. The actuator comprises three solenoids 521; three armatures 522,523,524, are each restrained by their own springs (not shown), in a way similar to that in the first actuator (FIG. 5). One single relay 525 with a spring 528 restrains a stop armature 526. Stop armatures 526 bears on armatures 522,523,524 via a pad 527 made of a high friction material. The operating principle is similar to that of the first actuator (FIG. 5) except that the solenoids may need to be switched on and off at the same time.

Figure 7:
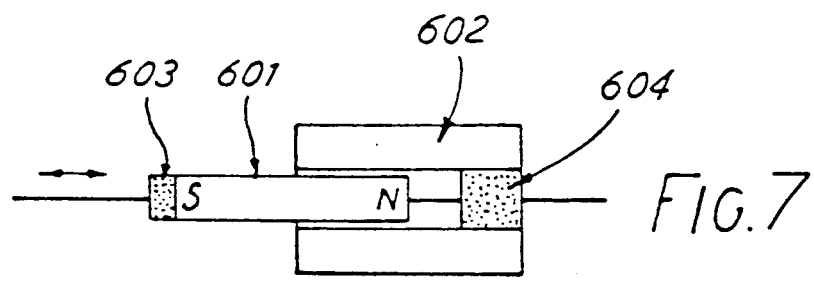

A third actuator (FIG. 7) is a solenoid type electromagnet with two stable, latching states comprising a permanent magnet armature 601, a solenoid 602 and two fixed stops 603,604 of soft magnetic materials. The direction of armature 601 motion depends upon the polarity of the solenoid 602. When the solenoid 602 is energised the armature 601 moves in one direction until it hits a stop 603 to which it stays attracted, even after de-energisation. Upon reversal of the solenoid 602 current, the attractive force holding the armature 601 to the stop 603 will be overcome and the armature 601 will move in the other direction until it hits the other stop 604 and stays attracted to it, even after de-energisation. Alternatively, the armature 601 may be made of a soft magnetic material and the fixed stops 603,604 made of permanent magnets. If the armature 601 is arranged to move substantially vertically only one magnetic latch is needed as the armature will be latched to the lower stop by gravity.

Figure 8:
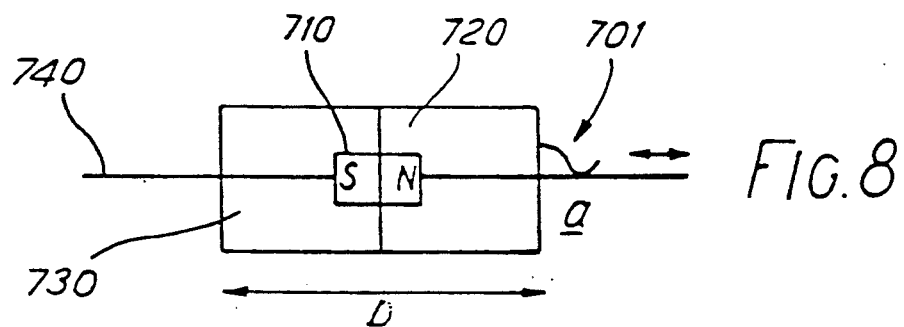
Figure 9:
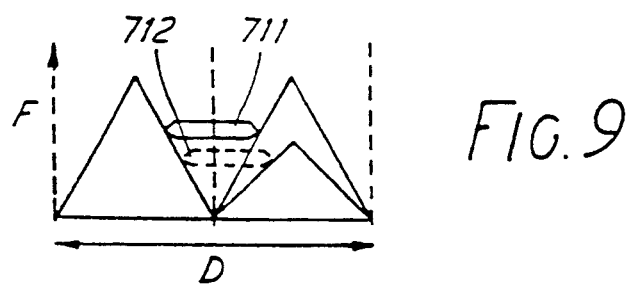
Figure 10:
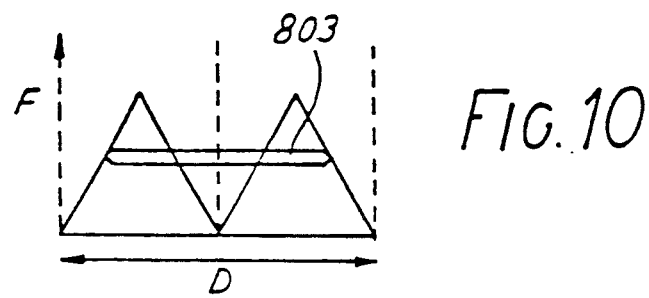

A fourth actuator (FIG. 8) is an electromagnet comprising two solenoids 720,730, an armature 710 and a shaft 740 on which a spring 701 is bearing. The function of the spring 701 is to maintain the shaft in any position by a frictional force sufficient to hold it against gravity and vibration when the solenoids 720,730 are not energised, but weak enough to allow the shaft to slide when the solenoids are energised. Hence any number of latching states can be obtained. The operation of the actuator when the armature 710 is a permanent magnet and the solenoids 720,730 have no yokes or partial yokes not extending through the ends of the solenoids 720,730 is illustrated in FIGS. 8 and 9. The curves show the variation in magnetic field strength (F) along the central axis (D) of the solenoids 720,730. If the solenoids 720,730 are both energised so that they repel the armature 710 with an equal force then the armature 710 will settle in a position 711 mid-way between the two solenoids 720,730. If one of the solenoids 720,730 is energised by a lesser amount than the other they will repel the armature 710 with different forces. The armature 710 will settle at a position 712 nearer to one solenoid 720,730 than the other. By varying the energisation of the two solenoids 720,730 the armature 710 can be moved to any desired position between the two solenoids 720,730. Any movement from the equilibrium position causes an increase in the repulsive force directed towards the armature 710 from the solenoid 720,730 that the armature 710 moves towards (FIG. 9). This will restore the armature 710 to the equilibrium position 711,712. If the armature 710 is made of a soft magnetic material the forces exerted on the armature 710 by the solenoids 720,730 will be attractive (FIG. 10); however, the principle of operation is the same as that of the hard magnetic armatured actuator.

A fifth actuator (FIG. 11) is similar to the fourth actuator with the spring 701 removed. A permanent moving magnet 910 is fixed to an armature 915 by a pin 916. The moving magnet 910, armature 915 and pin 916 move horizontally 914 between two solenoids 920,930. Across the path of travel of the moving magnet 910 is a first fixed piece 913 of soft magnetic material. A second fixed piece 912 is parallel to the first fixed piece 913. A third fixed piece 911 is parallel to the first 913 and second fixed pieces 912 and may loop around the path of travel midway between the first 913 and second fixed pieces 912. All of the fixed pieces 911,912,913 are made of soft magnetic material. The solenoids 920,930 have only "on" and "off" states. This produces three stable latching states for the moving magnet; adjacent to the first fixed magnet 913, midway between the first and second fixed magnets 913,912, and adjacent to the second fixed magnet 912. The armature 915 may be made of either hard or soft magnetic materials. In either case if only one solenoid 920,930 is energised one of the extreme latching states is obtained and if both solenoids 920,930 are energised the middle latching state is obtained. It is preferable that the armature 915 is long enough so that it always lies across both solenoids 920,930 during the operation of the actuator. Pieces 912,913 may be rings similar to ring 911 so that magnet 910 does not hit them at the ends of its travel.

A sixth actuator (FIG. 12) is similar to the fifth actuator except that the latching mechanism is inside two solenoids 820,830. The armature 810 is a permanent magnet; this is fitted to a pin 811, preferably made of a non-magnetic magnetic material. There are four fixed pieces 813,814,818,824 made of a soft magnetic material. Two are discs 818,813 that are adjacent to the ends of the solenoids 820,830 and two are rings 814,824 that are concentric with the core of the solenoids 820,830. The rings 814,824 are positioned equidistant from the midpoint of the solenoids 820,830 inside the solenoids 820,830. The latching positions of the armature 810 are adjacent to the ends of the solenoids 820,830 or in the middle of the solenoids 820,830 (as indicated in the figure). Pieces 813,818 may be rings similar to rings 814,824, so that armature 810 comes to rest within them rather than hitting them.

A seventh actuator (FIG. 13) is yet another type of electromagnet arrangement having one electromagnet 1950 and an armature 1951 capable of motion 1952. Three plates or platforms 1955,1956,1957 are mounted such that first plate 1957 is mounted on second plate 1956, the second plate 1956 is mounted on third plate 1955 and the third plate 1955 is mounted and fixed to the armature 1951. The first plate 1957 is spring-loaded on the second plate 1956 such that the first plate 1957 can slide on the second plate 1956. The second plate 1956 is also spring-loaded on the third plate 1955 such that the second plate 1956 can slide on the third plate 1955. A spring 1961 causes the first plate 1957 to rise above the second plate 1956, and a second spring 1962 causes the second plate 1956 to rise above the third plate 1955. Each plate may be used to drive a separate movable group of vanes. In operation when the electromagnet 1950 moves upward the three plates 1955,1956,1957 move by the same amount until the first plate 1957 hits a first stop 1967. When the electromagnet 1950 moves further up, the second plate 1956 moves upwards until a second stop 1966 hits the body of the first plate 1957. Further upward movement of the electromagnet 1950 causes the third plate 1955 to move upwards until a third stop 1965 hits the body of the second plate 1956. When the electromagnet moves downwards, the reverse will take place. Thus, all of the movable groups in a display element can be operated by a single actuator. Any number of plates may be used from two upwards. Other arrangements of springs and plates working on the same principle may also be used.

As an alternative to electromagnetic drive devices, electrostatic, piezoelectric, hydraulic, penumatic or any other suitable drive arrangement may be used.

I claim:

1. A light reflective display element having a plurality of sets of two vanes arranged with a forward surface of each set visible from the front, the vanes within each set lying one behind the other in closely adjacent parallel planes, the sets being also parallel but displaced one behind the other; one group of vanes being drivable so that its forward surfaces are selectively viewable from the front; and driving means capable of positioning the movable vanes in two extreme positions and also in an intermediate position, whereby differently coloured areas on each vane are exposed or covered so as to provide at least three different colour mixes from the two vanes of each set.

2. A display element as claimed in claim 1 comprising a third vane in each set, also movable, whereby in conjunction with said two vanes a range of six different colour mixes can be produced from the three vanes of each set.

3. A display element as claimed in claim 1 or 2 further comprising a vane in each set having a surface coloured with a single plain colour.

4. A display element as claimed in claim 1 or 2 wherein the areas each represent half the vane area extending transversely of the direction of movement.

5. A display element as claimed in claim 1 wherein the different colours used are primary or secondary colours.

6. A display element as claimed in claim 2 wherein the colours used on the vanes include white.

7. A display element according to claim 1 wherein each drivable group of vanes is mounted on a respective support element which moves parallel to the plane of movement of the vanes and to its axis.

8. A display element according to claim 1 wherein each drivable group of vanes is mounted on a respective support element which moves laterally substantially parallel to the plane of movement of the vanes.

9. A display element according to claim 5 wherein the support element pivots at a distance from the vane.

10. A display element according to claims 1, 2, 5 or 6 wherein the vanes of each drivable group can occupy two extreme positions and are continuously drivable by the driving means to any intermediate position.

11. A display element according to claims 1, 2, 5 or 6 wherein each drivable group of vanes can be oscillated by the driving means at a speed which is too quick for the human eye to follow.

12. A display element according to claims 1, 2, 5, 6, 7, 8 or 9 wherein each movable group of vanes is driven by an electromagnetic driving means.

13. A display element as claimed in claim 1 in having an actuating device comprising a magnetic armature moving through a solenoid wherein the armature can be stopped in one of a plurality of positions by magnetic interaction between magnetic members located respectively on the armature and at one or more points adjacent to the path of the armature.

14. A display element according to claims 1, 2, 5, 6, 7, 8 or 9 comprising a display device consisting of a plurality of pixels, with each pixel being comprised of the said display element, said pixels being arranged to form a matrix covering an area, and control means for individually setting the properties of each pixel whereby desired information can be displayed over said area.

15. A display device according to claim 14 wherein a vane of at least one pixel is arranged to conceal at least part of a vane of an adjacent pixel.

16. A display device according to claim 15 wherein the area lies in a plane, and the front surfaces of the vanes lie at an acute angle to said plane such that with the plane positioned vertically the normals to the front surfaces point downwards and forwards.

17. A display device according to claim 14 wherein the area lies in a plane, and the front surfaces of the vanes lie at an acute angle to said plane such that with the plane positioned vertically the normals to the front surfaces point downwards and forwards.

18. A light reflective display element having a plurality of sets of two or more vanes arranged with a forward surface of each set visible from the front, the vanes within each set lying one behind the other in closely adjacent parallel planes, the sets being also parallel but displaced one behind the other; all those groups, formed by corresponding vanes in each set, except one being individually drivable so that their forward surfaces are selectively viewable from the front; each group of vanes being coloured with plain colours different at least in part from that of the other group(s); and the vanes of at least one group being divided into at least two areas extending across the vanes transversely of their direction of movement, which areas carry different plain colours.

* * * * *